(12) United States Patent
Amarendran

(10) Patent No.: US 8,892,523 B2
(45) Date of Patent: Nov. 18, 2014

(54) AUTO SUMMARIZATION OF CONTENT

(75) Inventor: Arun Prasad Amarendran, Eatontown, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 13/492,519

(22) Filed: Jun. 8, 2012

(65) Prior Publication Data

US 2013/0332412 A1    Dec. 12, 2013

(51) Int. Cl.
*G06F 17/30* (2006.01)
*G06F 17/00* (2006.01)

(52) U.S. Cl.
USPC ............................................. 707/661; 707/664

(58) Field of Classification Search
CPC ............ G06F 17/30126; G06F 17/30696; G06F 17/3071; G06F 17/30864; G06F 17/30286; G06F 17/30734; G06F 17/30545; G06F 17/30221; G06F 17/30067; G06F 17/30153; G06F 17/30; G06F 17/30085; G06F 17/30088; G06F 17/30194
USPC .......................................... 707/634, 664, 661
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Manber et al., "WebGlimpse—Combining Browsing and Searching," 1997 Usenix Technical Conference, Jan. 1997, 12 pages.

(Continued)

*Primary Examiner* — Etienne Leroux
*Assistant Examiner* — Fariborz Khoshnoodi
(74) *Attorney, Agent, or Firm* — Knobbe Martens Olson & Bear LLP

(57) ABSTRACT

A method of summarizing data files includes implementing, at a server, a storage event for a data file, analyzing the data file and creating a summary of the data file, and storing the summary linked to the data file.

19 Claims, 5 Drawing Sheets

(56) References Cited

U.S. PATENT DOCUMENTS

| | | |
|---|---|---|
| 5,504,873 A | 4/1996 | Martin et al. |
| 5,519,865 A | 5/1996 | Kondo et al. |
| 5,544,345 A | 8/1996 | Carpenter et al. |
| 5,544,347 A | 8/1996 | Yanai et al. |
| 5,559,957 A | 9/1996 | Balk |
| 5,590,318 A | 12/1996 | Zbikowski et al. |
| 5,619,644 A | 4/1997 | Crockett et al. |
| 5,623,679 A | 4/1997 | Rivette et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,832,510 A | 11/1998 | Ito et al. |
| 5,875,478 A | 2/1999 | Blumenau |
| 5,887,134 A | 3/1999 | Ebrahim |
| 5,892,917 A | 4/1999 | Myerson |
| 5,901,327 A | 5/1999 | Ofek |
| 5,907,621 A | 5/1999 | Bachman et al. |
| 5,918,232 A | 6/1999 | Pouschine et al. |
| 5,924,102 A | 7/1999 | Perks |
| 5,950,205 A | 9/1999 | Aviani, Jr. |
| 5,953,721 A | 9/1999 | Doi et al. |
| 5,974,563 A | 10/1999 | Beeler, Jr. |
| 6,006,225 A | 12/1999 | Bowman |
| 6,021,415 A | 2/2000 | Cannon et al. |
| 6,023,710 A | 2/2000 | Steiner et al. |
| 6,026,414 A | 2/2000 | Anglin |
| 6,052,735 A | 4/2000 | Ulrich et al. |
| 6,058,066 A | 5/2000 | Norris et al. |
| 6,061,692 A | 5/2000 | Thomas et al. |
| 6,076,148 A | 6/2000 | Kedem et al. |
| 6,088,697 A | 7/2000 | Crockett et al. |
| 6,092,062 A | 7/2000 | Lohman et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,185,574 B1 | 2/2001 | Howard et al. |
| 6,212,512 B1 | 4/2001 | Barney et al. |
| 6,240,416 B1 | 5/2001 | Immon et al. |
| 6,260,068 B1 | 7/2001 | Zalewski et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,683 B1 | 7/2002 | Lamburt |
| 6,421,711 B1 | 7/2002 | Blumenau et al. |
| 6,421,779 B1 | 7/2002 | Kuroda et al. |
| 6,430,575 B1 | 8/2002 | Dourish et al. |
| 6,438,586 B1 | 8/2002 | Hass et al. |
| 6,438,595 B1 | 8/2002 | Blumenau et al. |
| 6,487,561 B1 | 11/2002 | Ofek et al. |
| 6,487,644 B1 | 11/2002 | Huebsch et al. |
| 6,499,026 B1 | 12/2002 | Rivette et al. |
| 6,507,852 B1 | 1/2003 | Dempsey |
| 6,516,314 B1 | 2/2003 | Birkler et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,542,468 B1 | 4/2003 | Hatakeyama |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,611,849 B1 | 8/2003 | Raff et al. |
| 6,625,623 B1 | 9/2003 | Midgley et al. |
| 6,647,396 B2 | 11/2003 | Parnell et al. |
| 6,658,436 B2 | 12/2003 | Oshinsky et al. |
| 6,658,526 B2 | 12/2003 | Nguyen et al. |
| 6,732,124 B1 | 5/2004 | Koseki et al. |
| 6,763,351 B1 | 7/2004 | Subramaniam et al. |
| 6,772,164 B2 | 8/2004 | Reinhardt |
| 6,775,790 B2 | 8/2004 | Reuter et al. |
| 6,779,003 B1 | 8/2004 | Midgley et al. |
| 6,785,864 B1 | 8/2004 | Te et al. |
| 6,792,472 B1 | 9/2004 | Otterness et al. |
| 6,820,035 B1 | 11/2004 | Zahavi |
| 6,834,329 B2 | 12/2004 | Sasaki et al. |
| 6,836,779 B2 | 12/2004 | Poulin |
| 6,836,806 B1 | 12/2004 | Raciborski et al. |
| 6,839,724 B2 | 1/2005 | Manchanda et al. |
| 6,847,984 B1 | 1/2005 | Midgley et al. |
| 6,857,053 B2 | 2/2005 | Bolik |
| 6,871,163 B2 | 3/2005 | Hiller et al. |
| 6,886,020 B1 | 4/2005 | Zahavi et al. |
| 6,920,537 B2 | 7/2005 | Ofek et al. |
| 6,925,476 B1 | 8/2005 | Multer et al. |
| 6,947,935 B1 | 9/2005 | Horvitz et al. |
| 6,976,053 B1 | 12/2005 | Tripp et al. |
| 6,983,322 B1 | 1/2006 | Tripp et al. |
| 6,996,616 B1 | 2/2006 | Leighton et al. |
| 7,003,519 B1 | 2/2006 | Biettron et al. |
| 7,035,880 B1 | 4/2006 | Crescenti et al. |
| 7,047,236 B2 | 5/2006 | Conroy |
| 7,068,597 B1 | 6/2006 | Fijolek et al. |
| 7,085,787 B2 | 8/2006 | Beier |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,130,860 B2 | 10/2006 | Pachet |
| 7,130,970 B2 | 10/2006 | Devassy et al. |
| 7,149,750 B2 | 12/2006 | Chadwick |
| 7,158,985 B1 | 1/2007 | Liskov |
| 7,165,082 B1 | 1/2007 | DeVos |
| 7,167,895 B1 | 1/2007 | Connelly |
| 7,171,619 B1 | 1/2007 | Bianco |
| 7,181,444 B2 | 2/2007 | Porter et al. |
| 7,194,454 B2 | 3/2007 | Hansen et al. |
| 7,197,502 B2 | 3/2007 | Feinsmith |
| 7,200,726 B1 | 4/2007 | Gole |
| 7,216,043 B2 | 5/2007 | Ransom et al. |
| 7,240,100 B1 | 7/2007 | Wein et al. |
| 7,246,207 B2 | 7/2007 | Kottomtharayil et al. |
| 7,246,211 B1 | 7/2007 | Beloussov et al. |
| 7,269,612 B2 | 9/2007 | Devarakonda et al. |
| 7,272,606 B2 | 9/2007 | Borthakur et al. |
| 7,330,997 B1 | 2/2008 | Odom |
| 7,340,652 B2 | 3/2008 | Jarvis et al. |
| 7,343,365 B2 | 3/2008 | Farnham et al. |
| 7,346,623 B2 | 3/2008 | Prahlad et al. |
| 7,346,676 B1 | 3/2008 | Swildens et al. |
| 7,356,657 B2 | 4/2008 | Mikami |
| 7,356,660 B2 | 4/2008 | Matsunami |
| 7,359,917 B2 | 4/2008 | Winter et al. |
| 7,366,859 B2 | 4/2008 | Per et al. |
| 7,386,663 B2 | 6/2008 | Cousins |
| 7,395,282 B1 | 7/2008 | Crescenti |

(56) References Cited

U.S. PATENT DOCUMENTS

| | | |
|---|---|---|
| 7,401,064 B1 | 7/2008 | Arone et al. |
| 7,418,464 B2 | 8/2008 | Cannon et al. |
| 7,430,587 B2 | 9/2008 | Malone et al. |
| 7,433,301 B2 | 10/2008 | Akahane et al. |
| 7,440,966 B2 | 10/2008 | Adkins |
| 7,440,984 B2 | 10/2008 | Augenstein |
| 7,454,569 B2 | 11/2008 | Kavuri et al. |
| 7,461,230 B1 | 12/2008 | Gupta et al. |
| 7,469,262 B2 | 12/2008 | Baskaran et al. |
| 7,472,312 B2 | 12/2008 | Jarvis et al. |
| 7,496,589 B1 | 2/2009 | Jain et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,512,814 B2 | 3/2009 | Chen |
| 7,529,745 B2 | 5/2009 | Ahluwalia et al. |
| 7,529,748 B2 | 5/2009 | Wen et al. |
| 7,532,340 B2 | 5/2009 | Koppich et al. |
| 7,533,103 B2 | 5/2009 | Brendle et al. |
| 7,533,181 B2 | 5/2009 | Dawson et al. |
| 7,533,230 B2 | 5/2009 | Glover et al. |
| 7,546,364 B2 | 6/2009 | Raman et al. |
| 7,583,861 B2 | 9/2009 | Hanna et al. |
| 7,584,227 B2 | 9/2009 | Gokhale |
| 7,590,997 B2 | 9/2009 | Perez |
| 7,613,728 B2 | 11/2009 | Png et al. |
| 7,613,752 B2 | 11/2009 | Prahlad et al. |
| 7,617,321 B2 | 11/2009 | Clark |
| 7,617,541 B2 | 11/2009 | Plotkin et al. |
| 7,620,710 B2 | 11/2009 | Kottomtharayil |
| 7,624,443 B2 | 11/2009 | Kramer |
| 7,627,598 B1 | 12/2009 | Burke |
| 7,627,617 B2 | 12/2009 | Kavuri et al. |
| 7,631,151 B2 | 12/2009 | Prahlad et al. |
| 7,634,478 B2 | 12/2009 | Yang |
| 7,657,550 B2 | 2/2010 | Prahlad et al. |
| 7,660,800 B2 | 2/2010 | Prahlad et al. |
| 7,660,807 B2 | 2/2010 | Prahlad et al. |
| 7,668,798 B2 | 2/2010 | Scanlon et al. |
| 7,668,884 B2 | 2/2010 | Prahlad et al. |
| 7,672,962 B2 | 3/2010 | Arrouye |
| 7,693,856 B2 | 4/2010 | Arrouye |
| 7,707,178 B2 | 4/2010 | Prahlad et al. |
| 7,711,700 B2 | 5/2010 | Prahlad et al. |
| 7,716,171 B2 | 5/2010 | Kryger |
| 7,716,191 B2 | 5/2010 | Blumenau |
| 7,720,801 B2 | 5/2010 | Chen |
| 7,725,605 B2 | 5/2010 | Palmeri |
| 7,725,671 B2 | 5/2010 | Prahlad et al. |
| 7,734,593 B2 | 6/2010 | Prahlad et al. |
| 7,734,669 B2 | 6/2010 | Kottomtharayil |
| 7,734,715 B2 | 6/2010 | Hyakutake et al. |
| 7,747,579 B2 | 6/2010 | Prahlad et al. |
| 7,756,837 B2 | 7/2010 | Williams |
| 7,801,864 B2 | 9/2010 | Prahlad et al. |
| 7,818,215 B2 | 10/2010 | King |
| 7,822,749 B2 | 10/2010 | Prahlad et al. |
| 7,831,553 B2 | 11/2010 | Prahlad et al. |
| 7,831,622 B2 | 11/2010 | Prahlad et al. |
| 7,831,795 B2 | 11/2010 | Prahlad et al. |
| 7,840,537 B2 | 11/2010 | Gokhale |
| 7,840,619 B2 | 11/2010 | Horn |
| 7,841,011 B2 | 11/2010 | Manson et al. |
| 7,849,059 B2 | 12/2010 | Prahlad et al. |
| 7,860,968 B2 | 12/2010 | Bornhoevd et al. |
| 7,882,077 B2 | 2/2011 | Gokhale |
| 7,882,098 B2 | 2/2011 | Prahlad |
| 7,890,467 B2 | 2/2011 | Watanabe |
| 7,890,469 B1 | 2/2011 | Maionchi |
| 7,925,856 B1 | 4/2011 | Greene |
| 7,933,920 B2 | 4/2011 | Kojima |
| 7,937,365 B2 | 5/2011 | Prahlad |
| 7,937,393 B2 | 5/2011 | Prahlad |
| 7,953,945 B2 | 5/2011 | Bender et al. |
| 7,962,709 B2 | 6/2011 | Agrawal |
| 7,966,495 B2 | 6/2011 | Ackerman |
| 8,006,125 B1 | 8/2011 | Meng et al. |
| 8,010,769 B2 | 8/2011 | Prahlad et al. |
| 8,037,031 B2 | 10/2011 | Gokhale |
| 8,041,677 B2 | 10/2011 | Sumner et al. |
| 8,051,045 B2 | 11/2011 | Vogler |
| 8,051,095 B2 | 11/2011 | Prahlad et al. |
| 8,055,650 B2 | 11/2011 | Scanlon |
| 8,055,745 B2 | 11/2011 | Atluri |
| 8,086,569 B2 | 12/2011 | Jasrasaria |
| 8,117,196 B2 | 2/2012 | Jones et al. |
| 8,131,680 B2 | 3/2012 | Prahlad et al. |
| 8,131,725 B2 | 3/2012 | Prahlad et al. |
| 8,140,786 B2 | 3/2012 | Bunte |
| 8,170,995 B2 | 5/2012 | Prahlad |
| 8,190,571 B2 | 5/2012 | Sen |
| 8,219,524 B2 | 7/2012 | Gokhale |
| 8,229,954 B2 | 7/2012 | Kottomtharayil et al. |
| 8,234,249 B2 | 7/2012 | Prahlad et al. |
| 8,271,548 B2 | 9/2012 | Prahlad et al. |
| 8,285,685 B2 | 10/2012 | Prahlad et al. |
| 8,285,964 B2 | 10/2012 | Brockway |
| 8,352,472 B2 | 1/2013 | Prahlad et al. |
| 8,401,996 B2 | 3/2013 | Muller |
| 8,442,983 B2 | 5/2013 | Pawar |
| 8,725,737 B2 | 5/2014 | Prahlad et al. |
| 2001/0047365 A1 | 11/2001 | Yonaitis |
| 2002/0004883 A1 | 1/2002 | Nguyen et al. |
| 2002/0049626 A1 | 4/2002 | Mathias et al. |
| 2002/0049738 A1 | 4/2002 | Epstein |
| 2002/0069324 A1 | 6/2002 | Gerasimov et al. |
| 2002/0083055 A1 | 6/2002 | Pachet et al. |
| 2002/0087550 A1 | 7/2002 | Carlyle et al. |
| 2002/0120741 A1 | 8/2002 | Webb et al. |
| 2002/0124137 A1 | 9/2002 | Ulrich et al. |
| 2002/0133476 A1 | 9/2002 | Reinhardt |
| 2002/0147734 A1 | 10/2002 | Shoup et al. |
| 2002/0161753 A1 | 10/2002 | Inaba et al. |
| 2002/0174107 A1 | 11/2002 | Poulin |
| 2002/0181395 A1 | 12/2002 | Foster et al. |
| 2003/0005119 A1 | 1/2003 | Mercier et al. |
| 2003/0018607 A1 | 1/2003 | Lennon et al. |
| 2003/0023893 A1 | 1/2003 | Lee et al. |
| 2003/0046313 A1 | 3/2003 | Leung |
| 2003/0079018 A1 | 4/2003 | Lolayekar et al. |
| 2003/0101183 A1 | 5/2003 | Kabra et al. |
| 2003/0115219 A1 | 6/2003 | Chadwick |
| 2003/0120625 A1 | 6/2003 | Jackson et al. |
| 2003/0130993 A1 | 7/2003 | Mendelevitch et al. |
| 2003/0161338 A1 | 8/2003 | Ng et al. |
| 2003/0182583 A1 | 9/2003 | Turco |
| 2004/0003078 A1 | 1/2004 | Todd et al. |
| 2004/0003132 A1 | 1/2004 | Stanley et al. |
| 2004/0006572 A1 | 1/2004 | Hoshino et al. |
| 2004/0010493 A1 | 1/2004 | Kojima et al. |
| 2004/0015468 A1 | 1/2004 | Beier et al. |
| 2004/0015514 A1 | 1/2004 | Melton et al. |
| 2004/0078632 A1 | 4/2004 | Infante et al. |
| 2004/0128269 A1 | 7/2004 | Milligan et al. |
| 2004/0128276 A1 | 7/2004 | Scanlon et al. |
| 2004/0139059 A1 | 7/2004 | Conroy et al. |
| 2004/0225437 A1 | 11/2004 | Endo et al. |
| 2004/0254919 A1 | 12/2004 | Giuseppini |
| 2004/0255161 A1 | 12/2004 | Cavanaugh |
| 2004/0260678 A1 | 12/2004 | Verbowski et al. |
| 2004/0260973 A1 | 12/2004 | Michelman |
| 2005/0010588 A1 | 1/2005 | Zalewski |
| 2005/0021537 A1 | 1/2005 | Brendle et al. |
| 2005/0037367 A9 | 2/2005 | Fiekowsky et al. |
| 2005/0050075 A1 | 3/2005 | Okamoto et al. |
| 2005/0055352 A1 | 3/2005 | White |
| 2005/0055386 A1 | 3/2005 | Tosey |
| 2005/0065961 A1 | 3/2005 | Aguren |
| 2005/0086231 A1 | 4/2005 | Moore |
| 2005/0097126 A1 | 5/2005 | Cabrera et al. |
| 2005/0114406 A1 | 5/2005 | Borthakur et al. |
| 2005/0120021 A1 | 6/2005 | Tang et al. |
| 2005/0154695 A1 | 7/2005 | Gonzalez et al. |
| 2005/0182773 A1 | 8/2005 | Feinsmith |

(56) References Cited

U.S. PATENT DOCUMENTS

| | | |
|---|---|---|
| 2005/0182797 A1 | 8/2005 | Adkins et al. |
| 2005/0188109 A1 | 8/2005 | Shiga et al. |
| 2005/0188248 A1 | 8/2005 | O'Brien et al. |
| 2005/0193128 A1 | 9/2005 | Dawson et al. |
| 2005/0198559 A1 | 9/2005 | Fujiwara |
| 2005/0203964 A1 | 9/2005 | Matsunami et al. |
| 2005/0216453 A1 | 9/2005 | Sasaki et al. |
| 2005/0228794 A1 | 10/2005 | Navas et al. |
| 2005/0228875 A1 | 10/2005 | Monitzer et al. |
| 2005/0246311 A1 | 11/2005 | Whelan et al. |
| 2005/0246376 A1 | 11/2005 | Lu et al. |
| 2005/0257083 A1 | 11/2005 | Cousins |
| 2005/0262097 A1 | 11/2005 | Sim-Tang et al. |
| 2005/0283504 A1 | 12/2005 | Suzuki et al. |
| 2005/0289193 A1 | 12/2005 | Arrouye et al. |
| 2006/0004820 A1 | 1/2006 | Claudatos et al. |
| 2006/0010227 A1 | 1/2006 | Atluri |
| 2006/0010341 A1 | 1/2006 | Kodama |
| 2006/0015524 A1 | 1/2006 | Gardiner et al. |
| 2006/0031225 A1 | 2/2006 | Palmeri et al. |
| 2006/0031263 A1 | 2/2006 | Arrouye et al. |
| 2006/0031287 A1 | 2/2006 | Ulrich et al. |
| 2006/0092861 A1 | 5/2006 | Corday et al. |
| 2006/0101285 A1 | 5/2006 | Chen et al. |
| 2006/0106814 A1 | 5/2006 | Blumenau et al. |
| 2006/0107089 A1 | 5/2006 | Jansz et al. |
| 2006/0171315 A1 | 8/2006 | Choi et al. |
| 2006/0195449 A1 | 8/2006 | Hunter et al. |
| 2006/0215564 A1 | 9/2006 | Breitgand et al. |
| 2006/0224846 A1 | 10/2006 | Amarendran et al. |
| 2006/0253495 A1 | 11/2006 | Png |
| 2006/0259468 A1 | 11/2006 | Brooks et al. |
| 2006/0259527 A1 | 11/2006 | Devarakonda |
| 2006/0259724 A1 | 11/2006 | Saika |
| 2006/0277154 A1 | 12/2006 | Lunt et al. |
| 2006/0294094 A1 | 12/2006 | King et al. |
| 2007/0027861 A1 | 2/2007 | Huentelman et al. |
| 2007/0027929 A1* | 2/2007 | Whelan .......... 707/200 |
| 2007/0033191 A1 | 2/2007 | Hornkvist et al. |
| 2007/0043956 A1 | 2/2007 | El Far et al. |
| 2007/0055737 A1 | 3/2007 | Yamashita et al. |
| 2007/0067304 A1 | 3/2007 | Ives |
| 2007/0100867 A1 | 5/2007 | Celik et al. |
| 2007/0112809 A1 | 5/2007 | Arrouye et al. |
| 2007/0130373 A1 | 6/2007 | Kalwitz |
| 2007/0179995 A1 | 8/2007 | Prahlad et al. |
| 2007/0185914 A1 | 8/2007 | Prahlad et al. |
| 2007/0185915 A1 | 8/2007 | Prahlad et al. |
| 2007/0185916 A1 | 8/2007 | Prahlad et al. |
| 2007/0185917 A1 | 8/2007 | Prahlad et al. |
| 2007/0185921 A1 | 8/2007 | Prahlad et al. |
| 2007/0185925 A1 | 8/2007 | Prahlad et al. |
| 2007/0185926 A1 | 8/2007 | Prahlad et al. |
| 2007/0185939 A1 | 8/2007 | Prahland et al. |
| 2007/0192360 A1 | 8/2007 | Prahlad et al. |
| 2007/0192385 A1 | 8/2007 | Prahlad et al. |
| 2007/0198570 A1 | 8/2007 | Prahlad et al. |
| 2007/0198593 A1 | 8/2007 | Prahlad et al. |
| 2007/0198601 A1 | 8/2007 | Prahlad et al. |
| 2007/0198608 A1 | 8/2007 | Prahlad et al. |
| 2007/0198611 A1 | 8/2007 | Prahlad et al. |
| 2007/0198613 A1 | 8/2007 | Prahlad et al. |
| 2007/0203937 A1 | 8/2007 | Prahlad et al. |
| 2007/0203938 A1 | 8/2007 | Prahlad et al. |
| 2007/0226535 A1 | 9/2007 | Gokhale |
| 2007/0256003 A1* | 11/2007 | Wagoner et al. .......... 715/501.1 |
| 2007/0260609 A1 | 11/2007 | Tulyani |
| 2007/0266032 A1 | 11/2007 | Blumenau |
| 2007/0282680 A1 | 12/2007 | Davis et al. |
| 2007/0288536 A1 | 12/2007 | Sen et al. |
| 2008/0021921 A1 | 1/2008 | Horn |
| 2008/0059515 A1 | 3/2008 | Fulton |
| 2008/0077594 A1 | 3/2008 | Ota |
| 2008/0091655 A1 | 4/2008 | Gokhale et al. |
| 2008/0091747 A1 | 4/2008 | Prahlad |
| 2008/0147878 A1 | 6/2008 | Kottomtharayil et al. |
| 2008/0183662 A1 | 7/2008 | Reed |
| 2008/0205301 A1 | 8/2008 | Burton et al. |
| 2008/0228771 A1 | 9/2008 | Prahlad et al. |
| 2008/0243796 A1 | 10/2008 | Prahlad et al. |
| 2008/0249996 A1 | 10/2008 | Prahlad et al. |
| 2008/0250178 A1 | 10/2008 | Haustein et al. |
| 2008/0263029 A1 | 10/2008 | Guha et al. |
| 2008/0294605 A1 | 11/2008 | Prahlad et al. |
| 2009/0113056 A1 | 4/2009 | Tameshige et al. |
| 2009/0172333 A1* | 7/2009 | Marcu et al. .................. 711/165 |
| 2009/0287665 A1 | 11/2009 | Prahlad et al. |
| 2009/0319534 A1 | 12/2009 | Gokhale |
| 2010/0057870 A1 | 3/2010 | Ahn et al. |
| 2010/0082672 A1 | 4/2010 | Kottomtharayil |
| 2010/0114952 A1 | 5/2010 | Scanlon et al. |
| 2010/0131461 A1 | 5/2010 | Prahlad et al. |
| 2010/0131467 A1 | 5/2010 | Prahlad et al. |
| 2010/0179941 A1 | 7/2010 | Agrawal |
| 2010/0205150 A1 | 8/2010 | Prahlad et al. |
| 2010/0211571 A1 | 8/2010 | Prahlad et al. |
| 2010/0257179 A1 | 10/2010 | Arrouye et al. |
| 2010/0299490 A1 | 11/2010 | Attarde |
| 2011/0016163 A1 | 1/2011 | Prahlad et al. |
| 2011/0047180 A1 | 2/2011 | Prahlad et al. |
| 2011/0078146 A1 | 3/2011 | Prahlad et al. |
| 2011/0178986 A1 | 7/2011 | Prahlad |
| 2011/0181383 A1 | 7/2011 | Lotfi et al. |
| 2012/0030432 A1 | 2/2012 | Kottomtharayil et al. |
| 2012/0072695 A1 | 3/2012 | Kottomtharayil et al. |
| 2012/0173531 A1 | 7/2012 | Prahlad et al. |
| 2012/0215745 A1 | 8/2012 | Prahlad |
| 2012/0254115 A1 | 10/2012 | Varadharajan |
| 2012/0271832 A1 | 10/2012 | Prahlad |
| 2013/0013609 A1 | 1/2013 | Prahlad et al. |
| 2013/0110790 A1* | 5/2013 | Matsumoto et al. .......... 707/679 |
| 2013/0151640 A1 | 6/2013 | Ahn et al. |
| 2013/0198221 A1* | 8/2013 | Roark et al. .................. 707/769 |

FOREIGN PATENT DOCUMENTS

| | | |
|---|---|---|
| EP | 0774715 | 5/1997 |
| EP | 0809184 | 11/1997 |
| EP | 0899662 | 3/1999 |
| EP | 0981090 | 2/2000 |
| EP | 1174795 | 1/2002 |
| WO | WO 94/12944 | 6/1994 |
| WO | WO 95/13580 | 5/1995 |
| WO | WO 99/12098 | 3/1999 |
| WO | WO 99/14692 | 3/1999 |
| WO | WO 01/06368 | 1/2001 |
| WO | WO 01/93537 | 12/2001 |
| WO | WO 03/060774 | 7/2003 |
| WO | WO 2004/010375 | 1/2004 |
| WO | WO 2004/063863 | 7/2004 |
| WO | WO 2005/055093 | 6/2005 |
| WO | WO 2007/062254 | 5/2007 |
| WO | WO 2007/062429 | 5/2007 |
| WO | WO 2008/049023 | 4/2008 |

OTHER PUBLICATIONS

Search Report for European Application No. 06 844 595.6, Mail Date: Sep. 26, 2008, 5 pages.

International Search Report and Preliminary Report on Patentability dated Jun. 3, 2008, PCT-US2006-045556.

Armstead et al., "Implementation of a Campus-Wide Distributed Mass Storage Service: The Dream vs. Reality," IEEE, 1995, pp. 190-199.

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Bhagwan, R. et al. "Total Recall: System Support for Automated Availability Management," Proceedings of the 1st Conference on Symposium on Networked Systems Design and Implementation, vol. 1, Mar. 3, 2004, XP055057350, Berkeley, CA, 14 pages.

(56) References Cited

OTHER PUBLICATIONS

Bowman et al. "Harvest: A Scalable, Customizable Discovery and Access System," Department of Computer Science, University of Colorado—Boulder, Revised Mar. 1995, 29 pages.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Cooperstein et al., "Keeping an Eye on Your NTFS Drives: The Windows 2000 Change Journal Explained," Sep. 1999, retrieved from http://www.microsoft.com/msj/0999/journal/journal.aspx on Nov. 10, 2005, 17 pages.
Cooperstein et al., "Keeping an Eye on Your NTFS Drives, Part II: Building a Change Journal Application," Microsoft Systems Journal, Oct. 1999, 14 pages.
Eitel, "Backup and Storage Management in Distributed Heterogeneous Environments," IEEE, 1994, pp. 124-126.
EMC Corporation, "Today's Choices for Business Continuity," 2004, 12 pages.
Gait, "The Optical File Cabinet: A Random-Access File system for Write-Once Optical Disks," IEEE Computer, vol. 21, No. 6, pp. 11-22 (1988).
Harrison, CDIA Training & Test Preparation Guide 2000, Specialized Solutions, 3 pages.
http://en.wikipedia.org/wiki/Machine_learning, Jun. 1, 2010.
Jander, "Launching Storage-Area Net," Data Communications, US, McGraw Hill, NY, vol. 27, No. 4(Mar. 21, 1998), pp. 64-72.
Langdon, Karl, et al., "Data Classification: Getting Started," Storage Magazine, Jul. 2005, retrieved from http://storagemagazine.techtarget.com/magPrintFriendly/0,293813,sid35_gci1104445,00.html; on Aug. 25, 2005, 3 pages.
Manber et al., "WebGlimpse—Combining Browsing and Searching," 1997 Usenix. Technical Conference, Jan. 1997, 12 pages.
Microsoft, "GetFileAttributesEx," updated Sep. 2005, retrieved from http://msdn.microsoft.com/library/en-us/fileio/fs/getfileattributesex.asp?frame=true on Nov. 10, 2005, 2 pages.
Microsoft Developer Network, "GetFileAttributes," online library article, [accessed on Nov. 10, 2005], 3 pages.
Microsoft, "WIN32_File_Attribute_Data," updated Sep. 2005, retrieved from http://msdn.microsoft.com/library/en-us/fileio/fs/win32_file_attribute_data_str.asp?frame on Nov. 10, 2005, 3 pages.
O'Neill, "New Tools to Classify Data," Storage Magazine, Aug. 2005, retrieved from http://storagemagazine.techtarget.com/magPrintFriendly/0,293813,sid35_gci1114703,00.html on Aug. 25, 2005, 4 pages.
Quick Reference Guide for West and East [date unknown, but verified as of Sep. 13, 2007], Search and Information Resource Administration, 2 pages.
Richter et al., "A File System for the 21st Century: Previewing the Windows NT 5.0 Files System," Nov. 1998, retrieved from http://www.microsoft.com/msj/1198/ntfs/ntfs.aspx on Nov. 10, 2005, 17 pages.
Rosenblum et al., "The Design and Implementation of a Log-Structure File System," Operating Systems Review SIGOPS, vol. 25, No. 5, New York, US, pp. 1-15 (May 1991).
Szor, The Art of Virus Research and Defense, Symantec Press (2005) ISBN 0-321-30454-3, Part 1 of 2.
Szor, The Art of Virus Research and Defense, Symantec Press (2005) ISBN 0-321-30454-3, Part 2 of 2.
"Text Figures," retrieved from http://www.microsoft.com/msj/1198.ntfs/ntfstextfigs.htm on Nov. 10, 2005, 7 pages.
Titus Labs—Announces Document Classification for Microsoft Word, Nov. 3, 2005, XP55034835, available at http://web.archive.org/web/20051126093136/http://www.titus-labs.com/about/DocClassRelease.html, 1 page.
Titus Labs Document Classification V1.1 for Microsoft Word—Document Policy Enforcement, available at: <http://web.archive.org/web/20060104112621/www.titus-labs.com/includes/PDF/DocClassDataSheet.pdf>, Nov. 3, 2005, 2 pages.
User's Manual for the Examiners Automated Search Tool (EAST) Jul. 22, 1999, Version 1.0, 179 pages.
Witten et al., Data Mining: Practical Machine Learning Tools and Techniques, Ian H. Witten & Eibe Frank, Elsevier (2005) ISBN 0-12-088407-0, Part 1 of 2.
Witten et al., Data Mining: Practical Machine Learning Tools and Techniques, Ian H. Witten & Eibe Frank, Elsevier (2005) ISBN 0-12-088407-0, Part 2 of 2.
Summons to attend oral proceedings dated May 2, 2011, 8 pages.
International Search Report and Written Opinion for International Application No. PCT/US07/81681, Mail Date Nov. 13, 2009, 8 pages.
PCT International Search Report and Written Opinion for International Application No. PCT/US07/81681, Mail Date Oct. 20, 2008, 11 pages.
International Search Report and Written Opinion for International Application No. PCT/US10/62069, Mail Date Mar. 7, 2011, 7 pages.
Supplementary European Search Report for European Application No. EP07844364, Mail Date Apr. 19, 2011, 9 pages.
Extended European Search Report for European Application No. EP11003795, Mail Date Nov. 21, 2012, 20 pages.
Examination Report for EP06844595.6 dated Sep. 26, 2008, 5 pages.
Decision to refuse a European Patent Application for Application No. EP 06844595.6, dated Oct. 12, 2011.
Partial International Search Results, PCT/US2006/045556 dated May 25, 2007, 2 pages.
International Search Report and Written Opinion re International Application No. PCT/US2006/045556, dated Jul. 17, 2007, in 16 pages.
Australian Examination Report dated Feb. 28, 2011, Application No. 2006318338.
Office Action in Canadian Application No. 2631197 dated Dec. 28, 2011.

* cited by examiner

AUTO SUMMARIZATION OF CONTENT

TECHNICAL FIELD

The present invention is related generally to the storage and summarization of data file contents, and more particularly to systems and methods of summarizing the content of data files through implementation of fuzzy logic analysis techniques.

BACKGROUND OF THE INVENTION

In recent years, many enterprises, whether business, governmental, or any other organized undertaking, require large amounts of information to be analyzed and available for use in the daily execution of their activities. Often the informational needs of the enterprise can take the form of documents being used daily and other information that may not have been accessed in weeks, months, or years, and may only exist in archive.

The growth of "paperless" offices has dramatically increased the scale at which digital information is being stored as the only version of certain data. With a vast sea of accessible data files available on a company's server, conventional Information Retrieval (IR) technologies have become more and more insufficient to find relevant information effectively. It is quite common that a keyword-based search on the company file storage system may return hundreds (or even thousands) of hits, by which the user is often overwhelmed. There is an increasing need for new technologies that may assist users in sifting through vast volumes of information, and which may quickly identify the most relevant data files.

Traditional search engines accept a search query from a user, search every data file, and generate a list of search results. The user typically views one or two of the results and then discards the results. However, some queries may also return summaries which greatly facilitate the task of finding the desired information in the data file. Typically, these "summaries" are just the 10 or 20 words surrounding the sought-for keyword and have no bearing on the context of the data file as a whole. Also, a query-based summarization system may have steep requirements in terms of transmission bandwidth, data storage, processor utilization, and time to return a result.

Hence a need exists for a way to expedite searching for data files and provide a summary more reflective of the data file it is taken from.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to data file storage and summarization.

Figure 1:
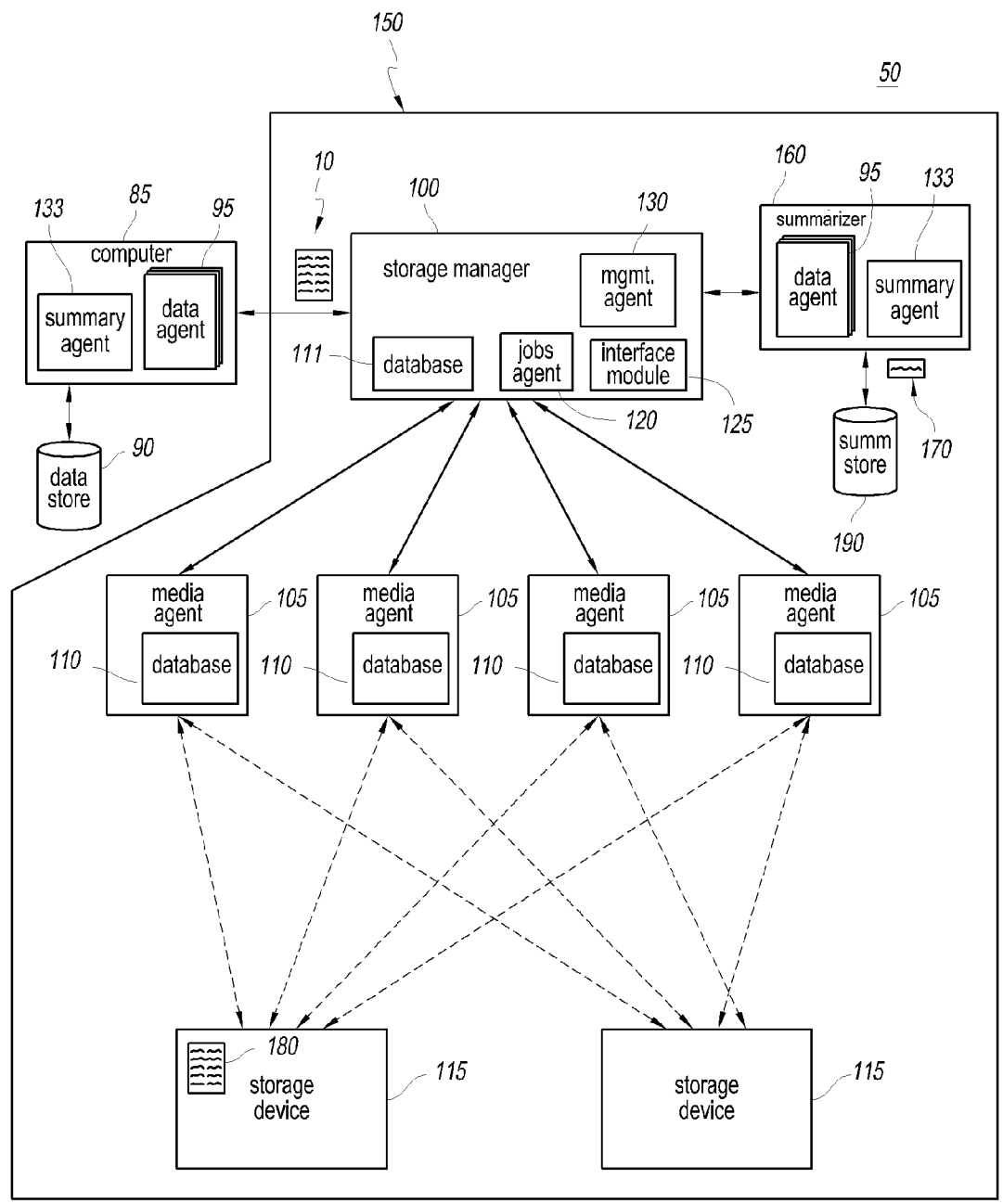
FIG. 1 is a block diagram of a system for performing storage and summary operations on electronic data in a computer network in accordance with certain aspects of the present invention.

Reference now is made in detail to the examples illustrated in the accompanying drawings and discussed below. FIG. 1 illustrates exemplary aspects and features of the present invention. FIG. 1 is a block diagram of a storage operation cell 50 that may perform storage and summary operations on electronic data in a computer network in accordance with an example as illustrated. As shown, a storage operation cell 50 may generally include a storage manager 100, a data agent 95, a media agent 105, a storage device 115, a client computer 85, and a data or information store 90. The storage operation cell 50 may also include certain other components such as databases 110, 111, a jobs agent 120, an interface module 125, a management agent 130, and a summary agent 133. The cell 50 may also include a summarizer 160 and a summation store 190.

Portions of such a system and elements thereof are exemplary of a modular storage management systems such as the CommVault QiNetix™ system, and also the CommVault GALAXY® backup system, available from CommVault Systems, Inc. of Oceanport, N.J., and further described in U.S. Pat. No. 7,035,880, which is incorporated herein by reference in its entirety.

A storage operation cell, such as cell 50, may generally include combinations of hardware and software components associated with performing storage operations on electronic data. Exemplary storage operation cells according to aspects of the invention can include CommCells as embodied in the QNet storage management system and the QiNetix storage management system by CommVault Systems of Oceanport, N.J. According to some aspects of the invention, storage operations cell 50 can be related to backup cells and provide some or all of the functionality of backup cells as described in U.S. Pat. No. 7,454,569 which is hereby incorporated by reference in its entirety.

Storage operations performed by storage operation cell 50 may include at least one of creating, storing, retrieving, synchronizing and migrating primary data copies and secondary data copies (which may include, for example, snapshot copies, backup copies, Hierarchical Storage Management ("HSM") copies, archive copies, and other types of copies of electronic data). Storage operation cell 50 may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information. The use of integrated management consoles may provide a unified view of the data operations across the network.

In addition to the integrated management consoles that allow an interface for at least one or more server side components 150, the client devices 85 may include a similar management console, in either form or function.

A unified view of the data operations collected across the entire storage network may provide an advantageous benefit in the management of the network. The unified view can present the system, or system administrator with a broad view of the utilized resources of the network. Presenting such data to one centralized management console may allow for a more complete and efficient administration of the available resources of the network. The storage manager 100, either via a preconfigured policy or via a manual operation from a system administrator, may reallocate resources to more efficiently run the network. Data paths from storage operation cells may be re-routed to avoid areas of the network which are congested by taking advantage of underutilized data paths or operation cells. Additionally, should a storage operation cell arrive at or exceed a database size maximum, storage device capacity maximum or fail outright, several routes of redundancy may be triggered to ensure the data arrives at the location for which it was intended. A unified view can provide the manager with a collective status of the entire network allowing the system to adapt and reallocate the many resources of the network for faster and more efficient utilization of those resources.

In some examples, storage operations can be performed according to a storage policy. A storage policy generally can be a data structure or other information source that includes a set of preferences and other storage criteria for performing a storage operation and/or other functions that relate to storage operation. The preferences and storage criteria can include, but are not limited to, a storage location, relationships between system components, network pathway to utilize, retention policies, data characteristics, compression or encryption requirements, preferred system components to utilize in a storage operation, summarization, and other criteria relating to a storage operation.

For example, a storage policy may indicate that certain data is to be stored in a specific storage device, retained for a specified period of time before being aged to another tier of secondary storage, copied to secondary storage using a specified number of streams, etc. In one example, a storage policy may be stored in a storage manager database 111. Alternatively, certain data may be stored to archive media as metadata for use in restore operations or other storage operations. In other examples, the data may be stored to other locations or components of the system.

A storage policy specifies when and how often to perform storage operations and may also specify performing certain storage operations (i.e. replicating certain data) on sub-clients of data including how to handle those sub-clients. A sub-client may represent static or dynamic associations of portions of data of a volume and may be generally mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc.

Storage operation cells may contain not only physical devices, but also may represent logical concepts, organizations, and hierarchies. For example, a first storage operation cell 50 may be configured to perform HSM operations, such as data backup or other types of data migration, and may include a variety of physical components including a storage manager 100 (or management agent 130), a media agent 105, a client component 85, and other components as described herein. A second storage operation cell can contain the same or similar physical components. However, it may be configured to perform storage resource management ("SRM") operations, such as monitoring a primary data copy or performing other known SRM operations.

In one example, a data agent 95 can be a software module or part of a software module that is generally responsible for archiving, migrating, and recovering data from client computer 85 stored in an information store 90 or other memory location. Each computer 85 has at least one data agent 95. Storage operation cell 50 can also support computers 85 having multiple clients (e.g., each computer can have multiple applications, with each application considered as either a client or sub-client).

In some examples, the data agents 95 can be distributed between client computer 85 and the storage manager 100 (and any other intermediate components (not explicitly shown)) or can be deployed from a remote location or its functions approximated by a remote process that performs some or all of the functions of the data agent 95. The data agent 95 may also generate metadata associated with the data that it is generally responsible for replicating, archiving, migrating, and recovering from client computer 85. This metadata may be appended or embedded within the client data as it is transferred to a backup or secondary storage location, such as a replication storage device, under the direction of storage manager 100.

One example may also include multiple data agents 95, each of which can be used to backup, migrate, synchronize, and recover data associated with a different application. For example, different individual data agents 95 can be designed to handle MICROSOFT EXCHANGE® data, MICROSOFT SHAREPOINT® data or other collaborative project and document management data, LOTUS NOTES® data, MICROSOFT WINDOWS 2000® file system data, MICROSOFT® Active Directory Objects data, and other types of data known in the art. Alternatively, one or more generic data agents 95 may be used to handle and process multiple data types rather than using the specialized data agents described above.

In an example utilizing a client computer 85 having two or more types of data, one data agent 95 can be used for each data type to archive, migrate, and restore the client computer 85 data. For example, to backup, migrate, synchronize, and restore all of the data on a MICROSOFT EXCHANGE 2000® server, the client computer 85 can use one MICROSOFT EXCHANGE 2000® Mailbox data agent to backup the EXCHANGE 2000® mailboxes, one MICROSOFT EXCHANGE 2000® data agent to backup the EXCHANGE 2000® databases, one MICROSOFT EXCHANGE 2000®. Public Folder data agent to backup the EXCHANGE 2000® Public Folders, and one MICROSOFT WINDOWS 2000® File System data agent to backup the file system of the computer 85. These data agents 95 may be treated as four separate data agents 95 by the system even though they reside on the same client computer 85.

In an alternative example, one or more generic data agents 95 can be used, each of which can be capable of handling two or more data types. For example, one generic data agent 95 can be used to back up, migrate and restore MICROSOFT EXCHANGE 2000® Mailbox data and MICROSOFT EXCHANGE 2000® Database data while another generic data agent can handle MICROSOFT EXCHANGE 2000® Public Folder data and MICROSOFT WINDOWS 2000® File System data.

While the illustrative examples described herein detail data agents implemented, specifically or generically, for Microsoft® applications, one skilled in the art should recognize that other application types (i.e. Oracle data, SQL data, LOTUS NOTES®, etc.) can be implemented without deviating from the scope of the present invention.

In one example, the storage manager 100 may include a software module (not shown) or other application that may coordinate and control storage operations performed by storage operation cell 50. The storage manager 100 may communicate with the elements of storage operation cell 50 including computers 85, data agents 95, media agents 105, and storage devices 115.

In one aspect, the storage manager 100 may include a jobs agent 120 that monitors the status of some or all storage operations previously performed, currently being performed, or scheduled to be performed by the storage operation cell 50. The jobs agent 120 may be linked with an interface module 125 (typically a software module or application). The interface module 125 may include information processing and display software, such as a graphical user interface ("GUI"), an application program interface ("API"), or other interactive interface through which users and system processes may retrieve information about the status of storage operations. Through the interface module 125, users may optionally issue instructions to various storage operation cells 50 regarding performance of the storage operations as described and contemplated by example of the present invention. For example, a user may modify a schedule concerning the number of pending snapshot copies or other types of copies scheduled as needed to suit particular needs or requirements. As another example, a user may utilize the GUI to view the status of pending storage operations in some or all of the storage operation cells in a given network or to monitor the status of certain components in a particular storage operation cell (e.g., the amount of storage capacity left in a particular storage device). As a further example, the interface module 125 may display the cost metrics associated with a particular type of data storage and may allow a user to determine the overall and target cost metrics associated with a particular data type. This determination may also be done for specific storage operation cells 50 or any other storage operation as predefined or user-defined.

One example of the storage manager 100 may also include a management agent 130 that is typically implemented as a software module or application program. The management agent 130 may provide an interface that allows various management components in other storage operation cells 50 to communicate with one another. For example, one example of a network configuration can include multiple cells adjacent to one another or otherwise logically related in a WAN or LAN configuration (not explicitly shown). With this arrangement, each cell 50 can be connected to the other through each respective management agent 130. This allows each cell 50 to send and receive certain pertinent information from other cells including status information, routing information, information regarding capacity and utilization, etc. These communication paths can also be used to convey information and instructions regarding storage operations.

In an example, the management agent 130 in the first storage operation cell 50 may communicate with a management agent 130 in a second storage operation cell (not illustrated) regarding the status of storage operations in the second storage operation cell. Another aspect may include a first management agent 130 in a first storage operation cell 50 that may communicate with a second management agent in a second storage operation cell to control the storage manager (and other components) of the second storage operation cell via the first management agent 130 contained in the storage manager 100 of the first storage operation cell.

A further aspect may include the management agent 130 in the first storage operation cell 50 communicating directly with and controlling the components in a second storage manager 100 in the second storage management cell. In an alternative example, the storage operation cells may also be organized hierarchically such that hierarchically superior cells control or pass information to hierarchically subordinate cells or vice versa.

The storage manager 100 may also maintain, in an example, an index cache, a database, or other data structure 111. The data stored in the database 111 can be used to indicate logical associations between components of the system, user preferences, management tasks, Storage Resource Management (SRM) data, Hierarchical Storage Management (HSM) data or other useful data. The SRM data may, for example, include information that relates to monitoring the health and status of the primary copies of data (e.g., live or production line copies). HSM data may, for example, be related to information associated with migrating and storing secondary data copies including archival volumes to various storage devices in the storage system. As further described herein, some of this information may be stored in a media agent database 110 or other local data store. For example, the storage manager 100 may use data from the database 111 to track logical associations between the media agents 105 and the storage devices 115.

In one example, a media agent 105 may be implemented a software module that conveys data, as directed by the storage manager 100, between computer 85 and one or more storage devices 115 such as a tape library, a magnetic media storage device, an optical media storage device, or any other suitable storage device. Media agents 105 may be linked with and control a storage device 115 associated with a particular media agent. In some examples, a media agent 105 may be considered to be associated with a particular storage device 115 if that media agent 105 is capable of routing and storing data to particular storage device 115.

In operation, a media agent 105 may be associated with a particular storage device 115 and may instruct the storage device to use a robotic arm or other retrieval means to load or eject a certain storage media, and to subsequently archive, migrate, or restore data to or from that media. The media agents 105 may communicate with the storage device 115 via a suitable communications path such as a SCSI (Small Computer System Interface), fiber channel or wireless communications link or other network connections known in the art such as a WAN or LAN. Storage device 115 may be linked to a data agent 105 via a Storage Area Network ("SAN").

Each media agent 105 may maintain an index cache, a database, or other data structure 110 which may store index data generated during backup, migration, synchronization, and restore and other storage operations as described herein. For example, performing storage operations on MICROSOFT EXCHANGE® data may generate index data. Such index data provides the media agent 105 or other external device with a fast and efficient mechanism for locating the data stored or backed up. In some examples, storage manager database 111 may store data associating a client computer 85 with a particular media agent 105 or storage device 115 as specified in a storage policy. The media agent database 110 can indicate where, specifically, the computer data is stored in the storage device 115, what specific files were stored, and other information associated with storage of the computer data. In some examples, such index data can be stored along with the data backed up in the storage device 115, with an additional copy of the index data written to the index cache 110. The data in the database 110 is thus readily available for use in storage operations and other activities without having to be first retrieved from the storage device 115.

In some examples, certain components may reside and execute on the same computer. For example, a client computer 85 including a data agent 95, a media agent 105, or a storage manager 100 coordinates and directs local archiving, migration, and retrieval application functions as further described in U.S. Pat. No. 7,035,880. Thus, client computer 85 may function independently or together with other similar client computers 85.

The summarizer 160, in some examples, may be included on the server side components 150. The summarizer 160, in one aspect, may review data files 10 as they are being stored through the summary agent 133. Alternately, the summarizer 160 may review data files 10 as they are copied and processed. The summary agent 133 may produce one or more summaries 170 of each of the data files 10 or group of data files 10. In one example, the summaries 170 may be stored in the summation store 190.

In another aspect, the summarizer 160 may be a stand-alone server, or farm of servers, that are tasked specifically to the summarization tasks as described below. Alternately, the summarizer 160 may be a software module that may utilize existing elements of the server side components 150 or the storage manager 100. Further, the summarizer 160 may also be a combination of hardware and software that yields the same results.

In an example, the summary agent 133 may open and review some or all data files 10 stored under the policies set by the storage manager 100. In an example process described below, the summary agent 133 may create a summary 170 condensing the data file 10 down. The condensed summary 170 may be any number of degrees "smaller" than the original data file 10. In certain aspects, the summary 170 is not a verbatim section of the original data file. For example, the summary 170 is not the first few sentences of the data file 10, or the 25 words surrounding a keyword.

The summary 170 may be one or more sentences, paragraphs or pages, depending on the length or size of the original data file 10. The length of the summary may be automatically dictated based on rules/logic, and/or the syntax of the data file. Alternately, the length may be dictated by the user. The user may select options for the length of the summary 170 based on the number of words, sentences, paragraphs, pages or an approximate percentage of the original data file 10. An example of this is a data file containing the novel "War and Peace", which contains approximately 560,000 words. The automatic summary might condense and summarize the data file 10 to approximately 100,000 words, while a user setting of a summary that is 10% of the original may condense the data file 10 to a 50,000 word summary.

Figure 2:
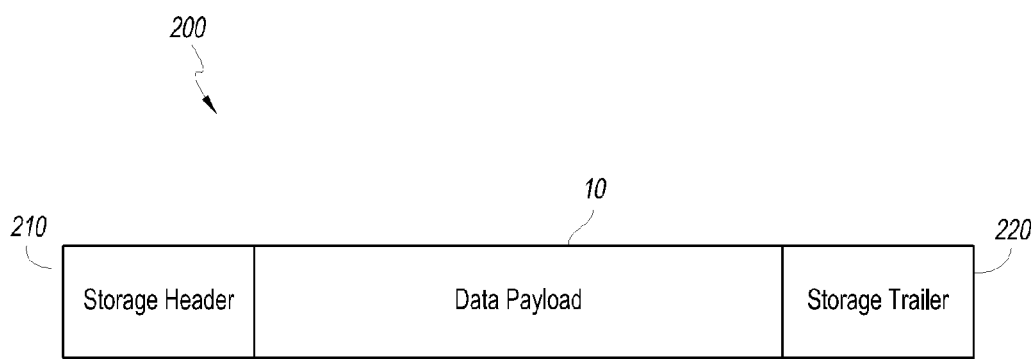
FIG. 2 is a block diagram of a data file in accordance with certain aspects of the present invention.

The summary 170 may then be stored in one or numerous locations. In one example, the summary 170 may be stored in the summation store 190. Here, the summaries 170 are not subject to archival and are readily retrievable. The summary 170 and the original data file 10 may be annotated with header information 210 or metadata to keep the files linked 200, in an aspect of the invention. In another example, the summaries 170 may be appended to the original data file 10 in a storage trailer 220, this summary 170 may then be archived along with the original data file 10. See, FIG. 2.

In a further example, the summaries 170 may be treated as any other file; and, once generated, may be archived by the storage manager 100. However, the summarizer 160 may be programmed with a rule not to generate a summary of the summary 170.

Furthermore, if the summaries 170 are generated only on archival, the summaries may be passed back to the computer 85 to be appended to the active data file 10, stored separately in the data store 90, or both.

The summarization process may be adapted to an existing storage system. The summarizer 160 can start by accessing some or all of the data files 10 currently residing on one or more of the storage devices 115. Here, the summary agent 133 begins the process of summarizing the data files 10. As above, the summaries 170 may be stored in at least one of the summation store 190 and with the archived copies in the storage device 115.

For the new data files 10 that may be generated on the computer/client device 85 the files can be summarized in a number of different examples. In one example, the data files 10 may be summarized during a storage procedure. Here, the summarizer 160/summary agent 133 may act in concert with the actions performed on the data files 10 in the storage device 115. As the data files 10 are transferred off the computer 85 and into the storage system, the data files 10 can be opened, summarized, appended and stored in the appropriate storage device 115 as dictated by the policy. The summaries 170 or at least links to the summaries 170 may be appended in or with the storage header 210 or trailer 220.

Alternately, there may be a data summary policy, with the summarizer 160 creating summaries 170 only at specific intervals, which may or may not coincide with the backup storage policy.

In an alternate example, as data files 10 are created and/or modified on the computer 85, a summary agent 133 may be present on the computer 85 to create/update a summary 170 in real-time or at a specific interval. For example, as a Word® document is being authored, the summary agent 133 is aware of creation/modification. Once the document is saved or exited out of, the summary agent 133 may begin the summarization process. Alternately, the summary agent 133 may be programmed to begin the summarization process after a certain time (e.g. midnight) or in preparation for a scheduled policy storage event procedure (e.g. backup or synchronization). In relation to the storage event procedure, the computer summary agent 133 may summarize the data file 10 as part of the storage event procedure, summarizing the data file 10 prior to releasing it to the storage manager 100.

Further, the summary agent 133 may be scheduled to summarize some or all of the files in advance of the storage event. For example, the summary procedure may begin at 11:00 pm for a storage event scheduled to start at midnight. When the summary agent 133 performs the summary, the summary 170 may be separately transmitted to the summation store 190 before, during, or after the transmission of the related data file to the storage manager 100 for the storage event. The computer 85 generated summaries 170 may be stored on the local data store 90 temporarily or permanently. Temporary storage may include the summaries 170 being stored until the next storage event or being held in summary 170 for a specific period of time. Permanent storage may include the summaries 170 being held until the underlying data file 10 is deleted or removed from the computer 85.

In relation to a search, there are numerous examples of how to utilize the summaries 170. In one aspect, the data files 10 are conventionally searched, and instead of the data files 10, the summaries 170 of the relevant hits may be returned. The actual data file 10 may also be returned with the summary 170. If the summary 170 is produced in lieu of the data file 10, the summary 170 may be further accessed to retrieve the actual data file 10.

In an alternate example, when a search is initiated, only the summaries 170 may be searched. An independent search engine (not illustrated) may be directed to search the summaries 170. In some examples, the summary agent 133 may act as a search engine and may review the summaries 170 for the relevant results. This may be facilitated if some or all of the summaries 170 are stored in one location, e.g. the summation store 190, which allows faster access. For those files local on the computer 85 that may not have been summarized, or their summaries 170 updated, they may be searched using the data file 10 or the summaries 170 may be completed on-the-fly by either the local or system summary agent 133, and the resulting summary 170 may be searched.

The search, summarization and storage policies may also act in concert. For an important set of data files 10, the summarization and/or storage windows may be set based on subject matter instead of, for example, file path or time. In an aspect of the invention, if a user is creating a number of documents based on a particular topic, the user can set a summary policy to summarize frequently and then set the storage policy to back up files based on that topic, as read from the summary 170, on a more frequent basis. An option may be presented in a backup GUI for "Subject Matter" and the summarizer 160 may group summaries 170 under a common topic and present the subject matter as a backup parameter rule, just like file type, file size, etc.

Turning now to the summary agent 133. In one example, the summaries 170 that are generated may be based on the gestalt of the data file 10 and not search topic dependent. For example, if the data file 10 has a portion devoted to recipes and another on computer programming, the summary 170 reflects both topics, proportionally to their frequency/length in the data file 10. In one aspect, the summary may be altered or truncated based on the search parameters. Thus, if a user searches for "recipe", one example may be to return a summary 120 that is truncated or edited to display only the portion of the summary 120 that is relevant to the keyword. Alternately, the search engine may return the portion devoted to computer programming as well as the portion devoted to recipes. This allows the user to manually distinguish the data file 10 and not have a biased summary set.

Figure 3:
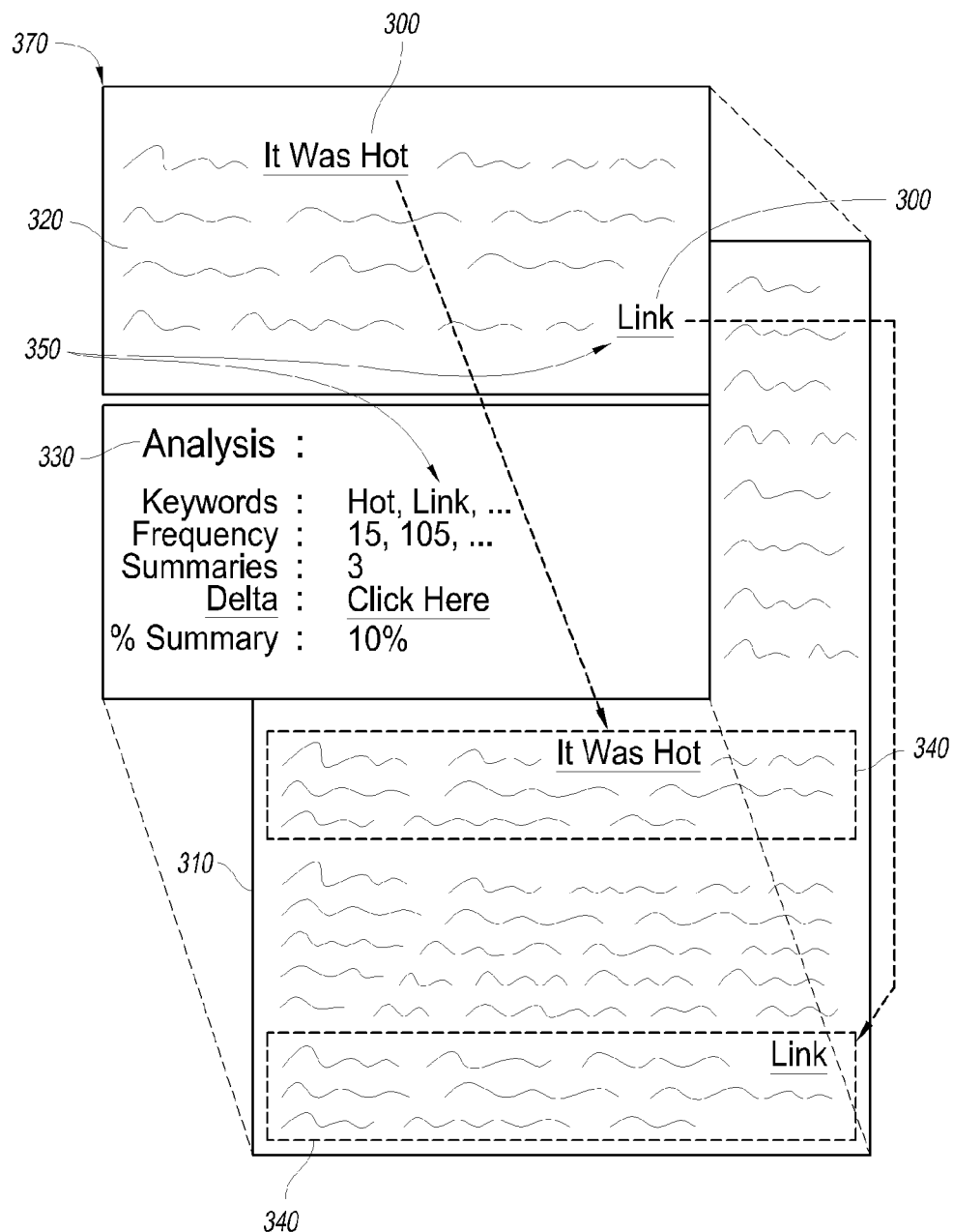
FIG. 3 illustrates an example of a summary in accordance with certain aspects of the present invention.

FIG. 3 illustrates an example of a summary 370. The summary 370 has a summation portion 320 and may have an analysis portion 330. The summation portion 320 has the text of the summary and characters, words, or sentences may be displayed as and may be actively linked 300 to the underlying data file 310. A user reviewing the summary 370 can click on the link 300 and be taken to a derivative point 340 in the data file 310 where that portion of the summary 370 is derived from. The summarization analysis 330. The analysis 330 may provide the user with keywords 350, word use frequency (e.g. top ten words, excluding: and, the, him, her; etc.), number of times summarized, a delta comparison between the previous summary and the present summary and other statistical information about the summarization process.

Further, a user may set the output parameters of the summary 170. As noted above, a user may select a word/line/page limit for the summary 170, requiring the summarizer 160 to condense the description of the data file 10 to a specified level of detail. Further, the output length may even be device/client 85 dependent. A user may, in one aspect, set the summary to be no more than a page when the summaries are delivered to a desktop or laptop; and no more than 10 lines if delivered to a bile station, or "smart phone" (e.g. cell phone, iPhone, Blackberry), or via a particular method (e-mail, SMS/EMS/MMS message, etc.).

The summaries 170 may be generated in any file or style format. The summaries may be generated in the format of the original data file. For example if an e-mail (i.e. Outlook®) is the data file 10 that is summarized, the summary 170 may also be in e-mail format.

Alternately, some of or all of the summaries 170 may be in a standard format (e.g. a generic text format, a word processor format, database format, etc.). The summaries 170 may be printed separately from their underlying data file 10. In addition, some or all of the summaries 170 retrieved as the result of a search query may be placed in a single file for ease of saving for future review or printing. Any or all of these options can be user selected.

Further, the summaries 170 may be retrieved and reviewed outside the user's awareness (i.e. invisible to the user) during the normal course of file management. A user may access their document management system (DMS) and the a summary can be displayed in a window along side the file name, similar to a preview window in Outlook®. In this example, once a user highlights a particular file, in a file selection list, in another window, instead of the data file 10 being previewed in its entirety, the summary 170 may be present.

Figure 4:
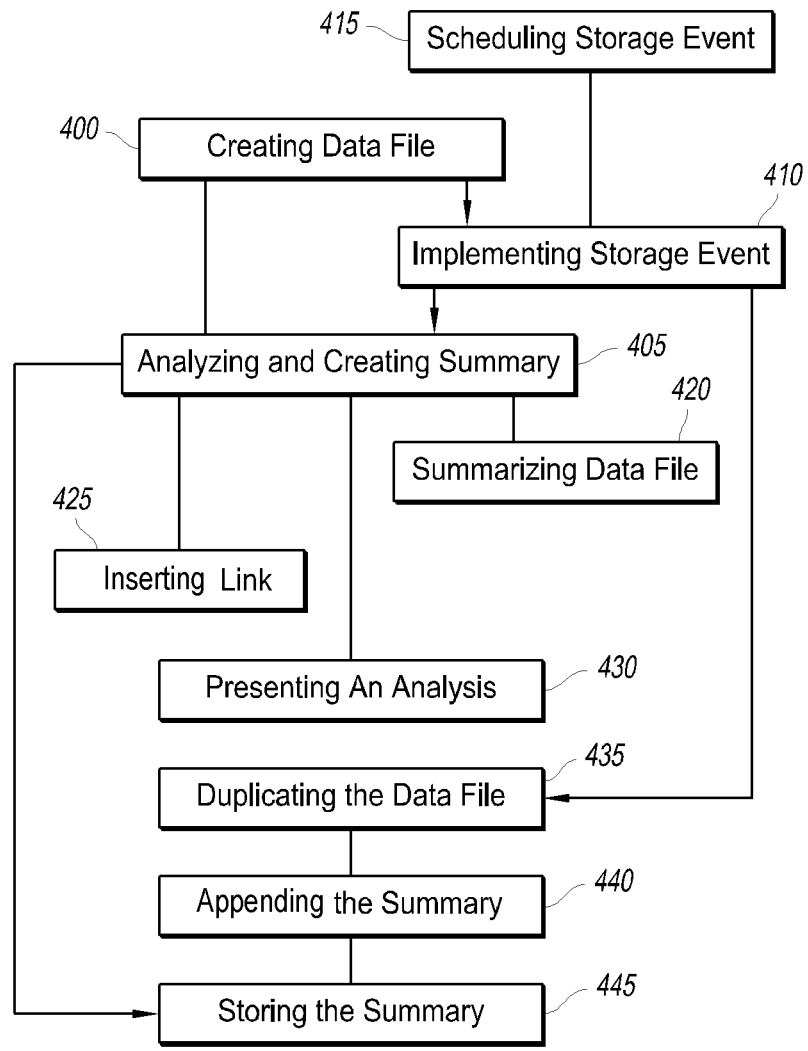
FIG. 4 illustrates a flow char of an example of a method of summarizing data files.

In further examples, FIG. 4 illustrates a method of summarizing data files. One step is to create the data file (step 400). The data file 310 may be typically created by a user on the client computer 85. Alternately, the method may be utilized on existing data files. Thus, in one aspect, creating the data file can be both creating a new data file or editing an existing data file. Here, the summarizer 160 can analyze and create the summary 370 (step 405) as the data file is being created. As noted above, the summary 370 can be created on the user computer 85.

A further aspect is to first implement a storage event (step 410). A storage event is at least one of a backup, a migration, a synchronization, or a restoration of the data file. Either prior to, during, or after the storage event, the data file may be analyzed and the summary created (step 405). The implementation of the storage event may be a scheduled event (step 415), which is based on any number of factors, for example a specified time, a user command, and a defined event. Thus, a storage event may be scheduled for, i.e. to occur at midnight every night, only when the user triggers the event, or only when the available memory in the main storage device is less than 20%.

As part of analyzing and creating the summary (step 405), the summarizer 160 may use a fuzzy method to create the summary 370. The fuzzy logic does not just truncate the data file 310, but creates a synthesis thereof. In summarizing the data file (step 420), the user can select the length of the summary 370. The length of the summary may be based on a number of words, sentences, paragraphs, and pages, a percentage of at least one of characters, words, sentences, or paragraphs in the data file or the device it is going to be distributed to for viewing. Another aspect of the summary 370 may be inserting links 300 into the summary (step 425), linking characters or text in the summary 370 to the characters or text in that data file that they were derived from, the derivation point 340. A further aspect may be presenting an analysis 330 of the data file 310 as part of the summary 370 (step 430). The analysis may present statistical information, keywords, word use frequency, and a comparison between a previous summary and the present summary 370.

Another example that may be further to implementing the storage event is to create a duplicate data file 180 (see, FIG. 1) containing at least one of the data file 310 or changes made to the data file (step 435). The duplication of the data file can occur either before or after the summary is created. The duplicate data file 180 and the summary 170 may be stored together on the same storage device 115, or on different storage devices. When the duplicate data file 180 and the summary 370 are stored together, they may be stored as separate files, or the summary can be appended to the header 210 or trailer 220 of the original or duplicate data file (step 440). If the duplicate data file 180 and the summary 370 are stored on separate storage devices 115, or on the same storage device 115 as separate files, the location of the summary 370 may be appended to the data file 310 (step 440). The location may be a network address, either to a LAN or WAN device, and appended using metadata. Regardless, of which storage device and in what format, the summary is stored (step 445).

Figure 5:
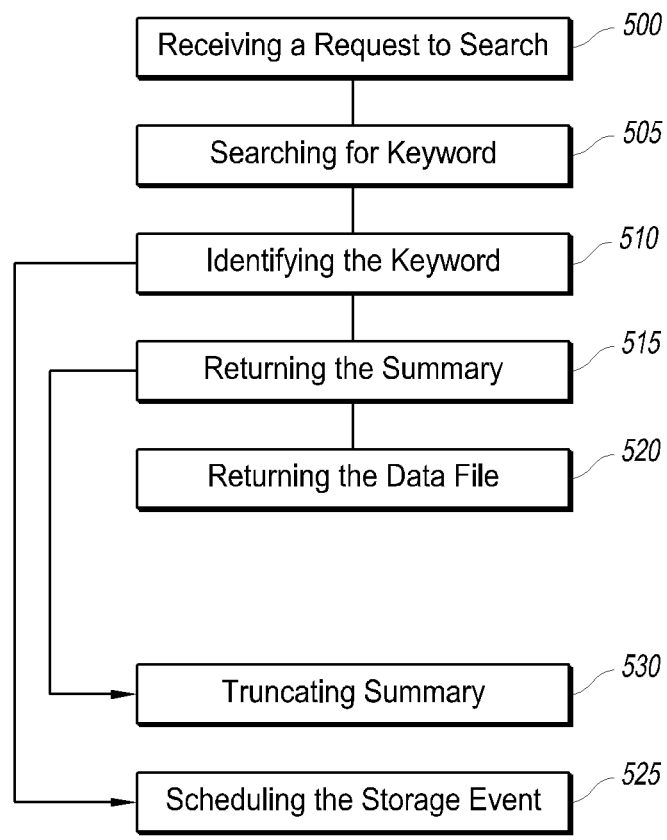
FIG. 5 illustrates a flow chart of an example of searching using summaries.

Once summaries are created, they can be searched. FIG. 5 illustrates an example of aspects of searching using summaries. In one aspect, the server 150 or storage manager 100 on the server may receive a request to search the data file 310 for a keyword 350 (step 500). In one aspect, the data file 310 may be searched, in another, the summary may searched for the keyword (step 505). Once the keyword is identified (step 510), the summary of the data file that contained the keyword, or the summary with the keyword, may be returned to the requestor (step 515). The user requesting the search results may request, in addition to summary, to also receive the data file (step 520). This request can be a default so that the summary and data file are returned together, or may be an additional request after the summary is sent.

Other aspects of searching and the keywords 350 in the summary 370 may allow for advanced scheduling and display features. In one example, the storage events for a data file may be scheduled based on the keywords 350 in the data file 310 (step 525). A user may set a storage policy for data files containing certain key words different than the storage policy typically implemented. Thus, a user may perform storage events on data files containing important key words with more frequency or redundancy. In another aspect, the summary can be truncated based on the device it is being displayed on or transmitted to (step 530). For example, when the summary is transmitted to a device with a small screen, i.e. a mobile station, smart phone, or data tablet, the summary can be truncated to facilitate reading on the smaller screen. In contrast, if the summary is displayed on a larger screen, e.g. a 24" monitor, the summary does not need to be truncated. It may also be displayer dependant, wherein sending a summary by e-mail may be truncated as opposed to if the summary is an attachment.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of summarizing electronic data files during a storage event in a storage operation cell, the method comprising the steps of:
   in the storage operation cell, which is managed by a storage manager component,
   implementing a storage event for a primary copy of an electronic data file that originated on a client computer, wherein the storage event comprises a backup operation of the electronic data file, wherein the backup operation generates a duplicate copy of the electronic data file, which is designated a duplicate data file, wherein the duplicate data file is stored, by a media agent component of the storage operation cell, to a secondary storage device in the storage operation cell;
   during the storage event, analyzing the duplicate data file and summarizing the contents of the duplicate data file into a summary, wherein a summary agent component of the storage operation cell performs the analyzing and the summarizing, based on applying fuzzy logic, to synthesize the contents of the duplicate data file into the summary, wherein the summary is substantially smaller than the primary copy of the electronic data file, and further wherein the summary comprises at least one link to the duplicate data file;
   storing the summary to at least one component of the storage operation cell; and
   transmitting, by the storage manager, in response to a keyword search directed at least in part to the duplicate data file in the secondary storage device, at least a portion of the summary of the contents of the duplicate data file.

2. The method of claim 1, wherein the summary agent component operates according to a data summary policy that is controlled and coordinated by the storage manager component that manages the storage operation cell.

3. The method of claim 1, wherein the transmitted portion of the summary is based on one or more output parameters associated with the summary.

4. The method of claim 1, further comprising the step of presenting, in response to the keyword search, the transmitted portion of the summary instead of presenting the duplicate data file.

5. The method of claim 1, wherein the summarizing the contents of the duplicate data file is also based on at least one of: a number of words, a number of sentences, a number of paragraphs, a number of pages, or a percentage of at least one of: characters, words, sentences, or paragraphs in the duplicate data file.

6. The method of claim 1, wherein the length of the summary is based on an administrable parameter associated with the size of the contents of the duplicate data file.

7. The method of claim 1, wherein the analyzing and summarizing step further comprises the step of generating an analysis portion of the summary, wherein the analysis portion comprises at least one of: a set of keywords that are present in the duplicate data file, word use frequency in the duplicate data file, and a comparison between a previous summary and the summary.

8. The method of claim 1, wherein the summary is appended to the duplicate data file when the duplicate data file is stored to the secondary storage device.

9. The method of claim 1, wherein the summary is stored separately from the duplicate data file.

10. The method of claim 1, wherein the transmitting in response to the keyword search comprises:
    identifying the summary associated with the duplicate data file, based on the received keyword search;
    searching the summary associated with the duplicate data file for the keyword;
    identifying the keyword in the summary; and
    presenting, in response to the keyword search, at least one of the summary and the duplicate data file.

11. The method of claim 1, further comprising the steps of:
    searching at least one of the duplicate data file and the summary for a keyword in response to the received keyword search;
    truncating the summary containing the keyword based on a displaying device; and displaying the truncated summary on the displaying device.

12. The method of claim 1, wherein the analyzing and summarizing is performed as the duplicate data file is being created.

13. The method of claim 1, wherein the analyzing and summarizing is performed upon exiting the creation of the duplicate data file.

14. A method of summarizing electronic data files in a storage operation cell during file restoration from secondary storage, the method comprising the steps of:
   in the storage operation cell, which is managed by a storage manager component,
   implementing a first storage event for a primary copy of an electronic data file that originated on a client computer, wherein the storage event generates a duplicate copy of the electronic data file, which is designated a duplicate data file, wherein the duplicate data file is stored, by a media agent component of the storage operation cell, to a secondary storage device in the storage operation cell;
   implementing a second storage event comprising a restoration operation of the duplicate data file to the client computer, thereby being designated a primary copy of the electronic data file;
   during the second storage event, analyzing the duplicate data file and summarizing the contents of the duplicate data file into a summary, wherein a summary agent component of the storage operation cell performs the analyzing and the summarizing, based on applying fuzzy logic, to synthesize the contents of the duplicate data file into the summary, wherein the summary is substantially smaller than the primary copy of the electronic data file, and further wherein the summary comprises a link to the duplicate data file in the secondary storage device; and
   storing the summary to at least one component of the storage operation cell.

15. The method of claim 14 wherein the implementing of the second storage event comprising the restoration operation of the duplicate data file is based at least in part on a keyword search that is directed at least in part to the duplicate data file in the secondary storage device.

16. The method of claim 14 wherein the summary is stored in a summary store component of the storage operation cell that is distinct from the secondary storage device where the duplicate data file is stored.

17. The method of claim 14, wherein the length of the summary is based on one or more rules programmed into the summary agent component.

18. The method of claim 14 wherein the length of the summary is based on the syntax of the content of the duplicate data file.

19. The method of claim 14 wherein the summary is not a verbatim section of the content of the duplicate data file.

* * * * *